United States Patent
Tada et al.

(10) Patent No.: US 8,886,928 B2
(45) Date of Patent: Nov. 11, 2014

(54) METHOD AND SYSTEM FOR DEVICE AUTHENTICATION

(71) Applicants: Chiba University, Chiba (JP); Safety Angle Inc., Ichikawa (JP)

(72) Inventors: Mitsuru Tada, Chiba (JP); Masayuki Itoi, Ichikawa (JP)

(73) Assignees: Chiba University, Chiba-shi (JP); Safety Angle Inc., Ichikawa-shi (JP)

( * ) Notice: Subject to any disclaimer, the term of this patent is extended or adjusted under 35 U.S.C. 154(b) by 10 days.

(21) Appl. No.: 13/752,397

(22) Filed: Jan. 29, 2013

(65) Prior Publication Data

US 2013/0346742 A1 Dec. 26, 2013

(30) Foreign Application Priority Data

Jun. 25, 2012 (JP) ................................. 2012-141762

(51) Int. Cl.
*H04L 29/00* (2006.01)
*H04L 29/06* (2006.01)

(52) U.S. Cl.
CPC .............. *H04L 63/08* (2013.01); *H04L 63/126* (2013.01); *H04L 63/0823* (2013.01)
USPC ....................................................... 713/155

(58) Field of Classification Search
USPC ....................................................... 713/155
See application file for complete search history.

(56) References Cited

U.S. PATENT DOCUMENTS

| | | | | |
|---|---|---|---|---|
| 7,818,578 | B2 * | 10/2010 | Lewis et al. | 713/176 |
| 7,856,554 | B2 * | 12/2010 | Lapstun et al. | 713/176 |
| 2005/0223233 | A1 | 10/2005 | Ishidera | |
| 2010/0017860 | A1 | 1/2010 | Ishida | |

FOREIGN PATENT DOCUMENTS

| | | |
|---|---|---|
| JP | 2007-267153 A | 10/2007 |
| JP | 2010-217604 A | 9/2010 |

OTHER PUBLICATIONS

"Cybertrust DeviceID"; https://www.cybertrust.ne.jp/MDM/deviceid/index.html.

* cited by examiner

*Primary Examiner* — Tu Nguyen
(74) *Attorney, Agent, or Firm* — Joseph P. Farrar, Esq.

(57) ABSTRACT

An information processing device, which is used by a user and includes a storage device, encodes target information required for a device authentication by a server by using device-specific information or information based on the device-specific information as an encryption key, and stores the encoded target information. The information processing device uses a decryption key that corresponds to the encryption key used in the generation of the stored encoded target information to decode the encoded target information, and sends the decoded target information to the server. The server receives the target information from the information processing device, and determines whether or not the received target information is correct.

13 Claims, 4 Drawing Sheets

METHOD AND SYSTEM FOR DEVICE AUTHENTICATION

BACKGROUND

The present invention generally relates to device authentication technology, and particularly to device authentication technology for electronically confirming whether or not a device for performing an action such as logging in to a server, for example, is legitimate.

As technology of this type, for example, Cybertrust Japan Co., Ltd.'s device authentication technology, called Cybertrust DeviceID, is known. With Cybertrust DeviceID, an electronic certificate is installed in a device (typically an information processing terminal) that is identified using a terminal identification number, thereby enabling the device to be authenticated.

SUMMARY

With Cybertrust DeviceID, a certificate is stored in a secured storage area of the device (a storage area that is inaccessible to the device user, among storage areas which the device includes) and is subjected to access control to make reproduction impossible. Thus, a device that lacks a secured storage area is unable to use the Cybertrust DeviceID.

Also, with Cybertrust DeviceID, device-specific information (information that is specific to the device (typically identification information)), such as a terminal identification number, must be notified to a server that performs device authentication. Device-specific information makes it possible to uniquely identify a device, and as such, the notification of device-specific information to other devices (for example, a server) than the device itself poses a problem from the standpoint of privacy.

Therefore, an object of the present invention is to make it possible to authenticate a device regardless of whether or not a secured storage area exists, and, in addition, to make device authentication possible without notifying a server that performs device authentication of the device-specific information.

An information processing device, which is used by a user and includes a storage device, encodes target information required for device authentication by a server by using as an encryption key either device-specific information itself, which is information specific to the information processing device, or information based on the device-specific information, and stores the encoded target information. The information processing device uses a decryption key corresponding to the encryption key used in the generation of the encoded target information that is stored, to decode the encoded target information, and sends the decoded target information to the server. The server receives the target information from the information processing device and determines whether or not the received target information is correct.

The target information, for example, is a certificate (an electronic certificate) described in the examples explained further below, but the target information is not limited to a certificate, and may be another type of information (for example, random information (a random number sequence)). Also, the encryption key may be based on user-stored information (for example, a password or birth date) in addition to the device-specific information.

The present invention makes it possible to authenticate an information processing device regardless of whether or not a secured storage area exists, and, in addition, makes it possible to authenticate an information processing device without communicating the device-specific information of the information processing device to a server. Also, the target information stored in the information processing device is encoded, and the encoded target information can not be correctly decoded without using an encryption key based on either the device-specific information itself in the information processing device that encoded the target information or information based on this device-specific information. As such, even in a case where the target information leaks out from the information processing device, this target information can not be used to authenticate another information processing device.

DESCRIPTION OF AN EMBODIMENT

Figure 1:
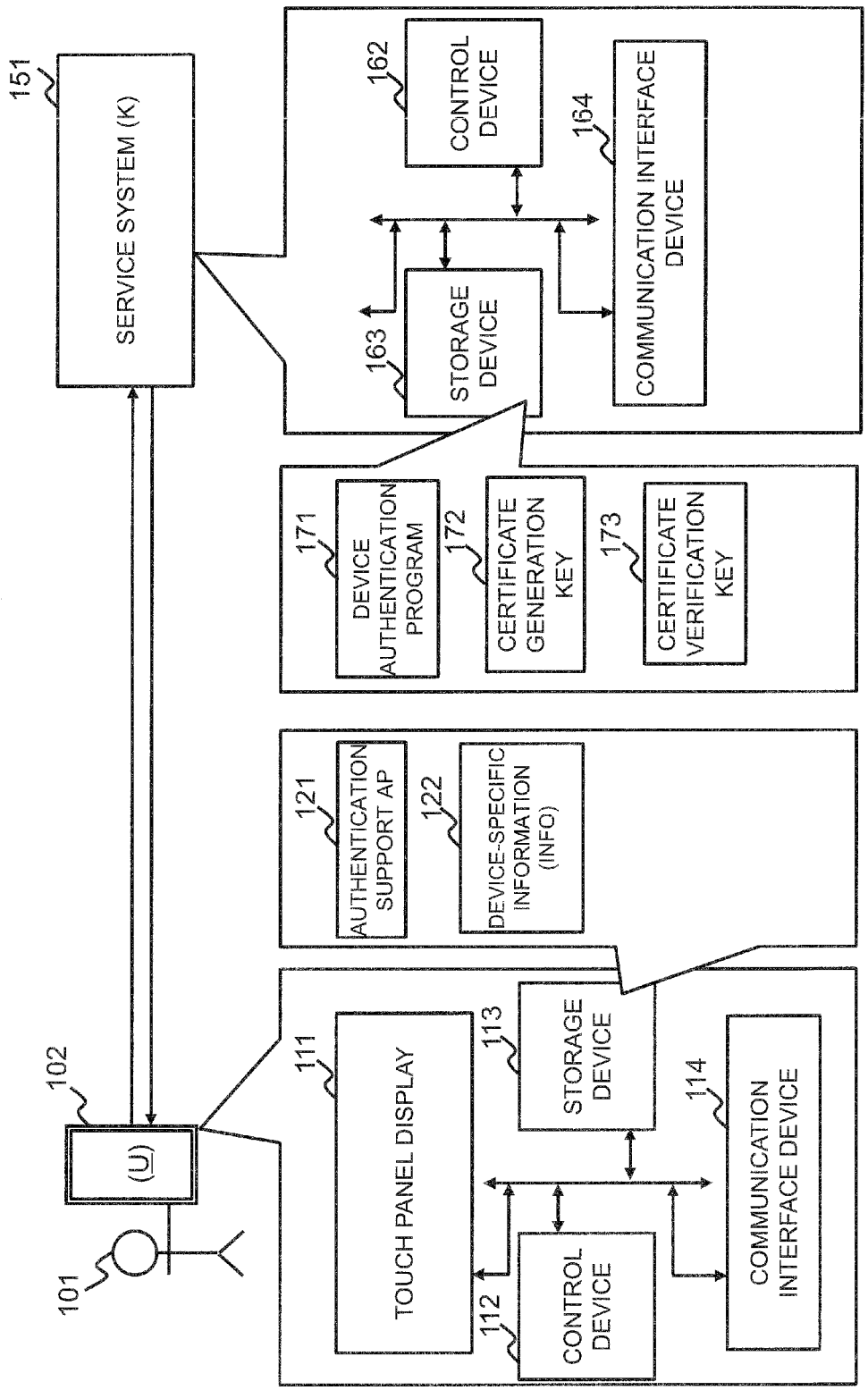
FIG. 1 shows a configuration of a device authentication system related to an embodiment.

An embodiment will be explained hereinbelow by referring to the drawings. Furthermore, there may be cases where processing is explained having a computer program as the doer of the action, but since the stipulated processing is performed in accordance with a program being executed by a processor, the processor may also be used as the doer of the action in the explanation of this processing. A process, which is explained using the program as the doer of the action, may be regarded as a process performed by a computer, such as an information processing device. Furthermore, either a portion or all of the processing performed in accordance with the processor executing the program may be realized using hardware circuits.

FIG. 1 shows a configuration of a device authentication system related to an embodiment.

There is an information processing device 102 used by a user 101, and a service system 151, which is an example of a server. In the following explanation, the information processing device 102 may be represented as "U" and the service system 151 may be represented as "K".

The information processing device 102, for example, is a smartphone. The smartphone is one type of smart device. A smart device is not simply for computational processing, but rather is a multifunctional device that can be used in a large number of diverse applications, and typically is a smartphone 102, such as an iPhone (registered trademark), or a tablet PC (Personal Computer) like an iPad (registered trademark). Naturally, the information processing device 102 may be a smart device other than a smartphone, or may be a device that is not a smart device, such as a mobile telephone that does not belong to the smart device category, or another, either portable or stationary information processing device.

The service system 151 is one type of computer (a computer system), and when the service system 151 provides a service to the user 101, performs authentication for the information processing device 102 that attempts to use this service. Specifically, for example, the service system 151 sends the information processing device 102 an electronic certificate in a user registration phase for the information processing device 102 to register user-related information in the service system 151, and receives the certificate from the information processing device 102 and authenticates the information processing device 102 on the basis of this certificate in an authentication phase, which is a phase subsequent to the user registration phase. There may be multiple different service systems 151 being operated by different companies and providing different services. In addition, the service system 151 may provide any type of service whatsoever.

The information processing device 102 and the service system 151 will be explained in detail hereinbelow.

The information processing device 102, as was explained hereinabove, is a smartphone, for example, and comprises a touch panel display 111, a storage device 113, a communication interface device 114 for communicating wirelessly with an external device, such as the service system 151, and a control device 112 coupled to the devices 111, 113, and 114. In this embodiment, the "storage device" signifies a group of one or more storage devices, and may include at least one of a primary storage device and an auxiliary storage device. The storage device may include one or more memories, and the one or more memories may include at least one of a memory used as the primary storage device and a memory used as the auxiliary storage device. Also, in this embodiment, the "control device" typically includes a processor such as a CPU (Central Processing Unit), and, in addition, may include a prescribed hardware circuit (for example, a circuit for performing encoding and/or decoding). Also, in this embodiment, the "communication interface device" signifies a group of one or more communication interface devices, and, for example, may include a communication interface device for wireless communications.

The storage device 113 stores a computer program such as an authentication support application program (hereinafter, authentication support AP) 121, and information such as device-specific information 122, which is information specific to the information processing device 102.

The authentication support AP 121 encodes a certificate that the information processing device 102 has received from the service system 151, and decodes the encoded certificate and sends the decoded certificate to the service system 151. The authentication support AP 121 may be a program (for example, an application program that runs on the operating system of the information processing device 102) downloaded and installed in the information processing device 102 from either the service system 151 or another server, may be a program installed from a portable storage medium, or may be a program that was pre-installed in the information processing device 102. The authentication support AP 121 may be a program dedicate to one certain service system 151, or may be a program shared by multiple service systems 151.

The device-specific information 122 may be any kind of information that makes it possible to uniquely identify the information processing device 102, and, for example, may be any of a individual identification number (IMEI (International Mobile Equipment Identity)), a telephone number, a MAC address, a manufacturing number, or the manufacturing number of a SIM (Subscriber Identity Module) card, and may be a combination of the information of any two or more thereof.

The service system 151 comprises a storage device 163, a communication interface device 164 for communicating with an external device such as the information processing device 102, and a control device 162 coupled to the devices 163 and 164.

The storage device 163 stores a computer program such as a device authentication program 171, and information such as a certificate generation key 172 and a certificate verification key 173. Either a portion or all of the information used by the service system 151 may be stored, either instead of or in addition to the storage device 163, in an external storage apparatus (not shown in the drawing) with which the service system 151 is capable of communicating via the communication interface device 164. The certificate generation key 172 and the certificate verification key 173 are separate in this embodiment, but a certificate may be generated and verified using the same key.

The device authentication program 171 sends a certificate to the information processing device 102 in the user registration phase, receives the certificate from the information processing device 102 in the authentication phase, and authenticates the information processing device 102 on the basis of this certificate.

The certificate generation key 172 is information used when generating a certificate. The certificate verification key 173 is information used when verifying the certificate.

The flow of the processing performed in this embodiment will be explained hereinbelow.

<User Registration Phase>

Figure 2:
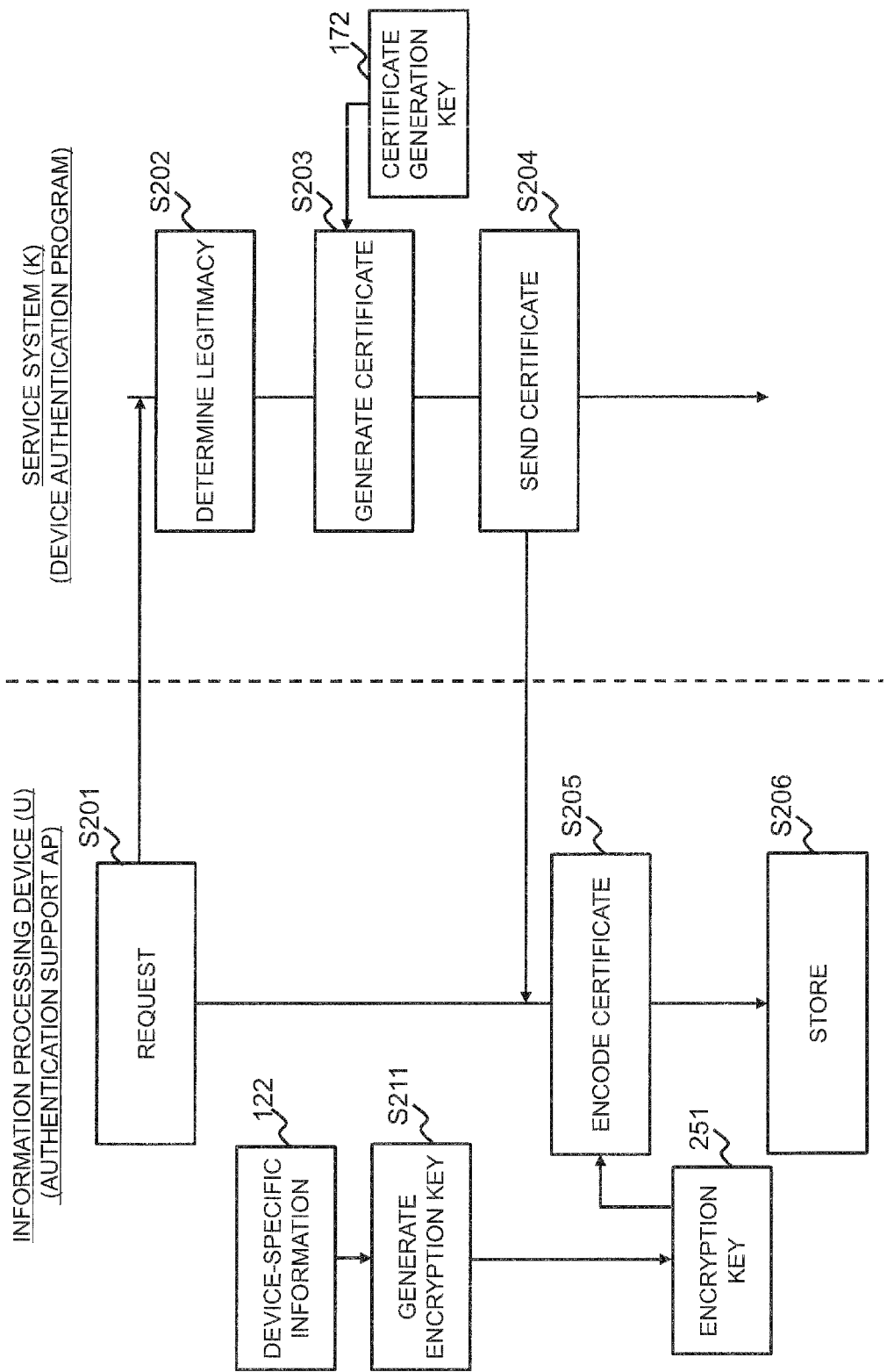
FIG. 2 shows the flow of processing performed in a user registration phase.

FIG. 2 shows the flow of processing performed in the user registration phase.

The user registration phase, for example, is started when the information processing device 102 has booted up the authentication support AP 121 in accordance with an instruction from the user 101, and the authentication support AP 121 has received a prescribed instruction from the user 101.

The authentication support AP 121 sends a user registration request to the service system 151 (S201). A certificate may be generated on the basis of information from the information processing device 102, in which case, the request sent in S201 may include information used in the generation of the certificate (for example, a password or a serial number n, which will be explained further below).

The service system 151 receives an information set and stores this information set in the storage device (for example, a memory) 163. The device authentication program 171 determines whether or not a prescribed type of information in the received information set is correct (S202).

In a case where the result of the determination in S202 is affirmative, the device authentication program 171 uses the certificate generation key 172 to generate a certificate (S203), and stores the certificate verification key 173, which is information required to verify the certificate, in the storage device (for example, a memory) 163. The certificate verification key 173, for example, may be either a portion or all of a message (for example, $u_n$, which will be explained further below) included in the certificate. In this embodiment, since the system for generating the certificate and the system for verifying the certificate are the same system, the certificate verification key 173 may be a portion of the message included in the certificate. The certificate verification key 173, for example, may be information that has been generated at random, or may be information that has been allocated to the user. The device authentication program 171 sends the generated certificate to the information processing device 102 that is the source of the user registration request (S204).

The information processing device 102 receives the certificate from the service system 151. The authentication support AP 121 uses an encryption key 251, which is information based on the device-specific information 122, to encode the received certificate (S205), and stores the encoded certificate in the storage device (for example, a memory) 113 (S206). Furthermore, after the certificate has been encoded (for example, immediately after the certificate has been encoded), the authentication support AP 121 deletes the received certificate itself (the target information prior to being encoded using the encryption key 251).

According to the user registration phase described hereinabove, the certificate is encoded using information based on the device-specific information 122 as an encryption key 251. The encryption key 251 is information based on the device-specific information 122, such as a hash value of the device-specific information 122, but may also be the device-specific information 122 itself. The encryption key 251, for example, may be generated by the authentication support AP 121 (S211), and may be stored in the storage device 113. The generation of the encryption key 251 may be performed in a different phase than the user registration phase, may be performed prior to S201, or may be performed in S201 through S205.

<Authentication Phase>

Figure 3:
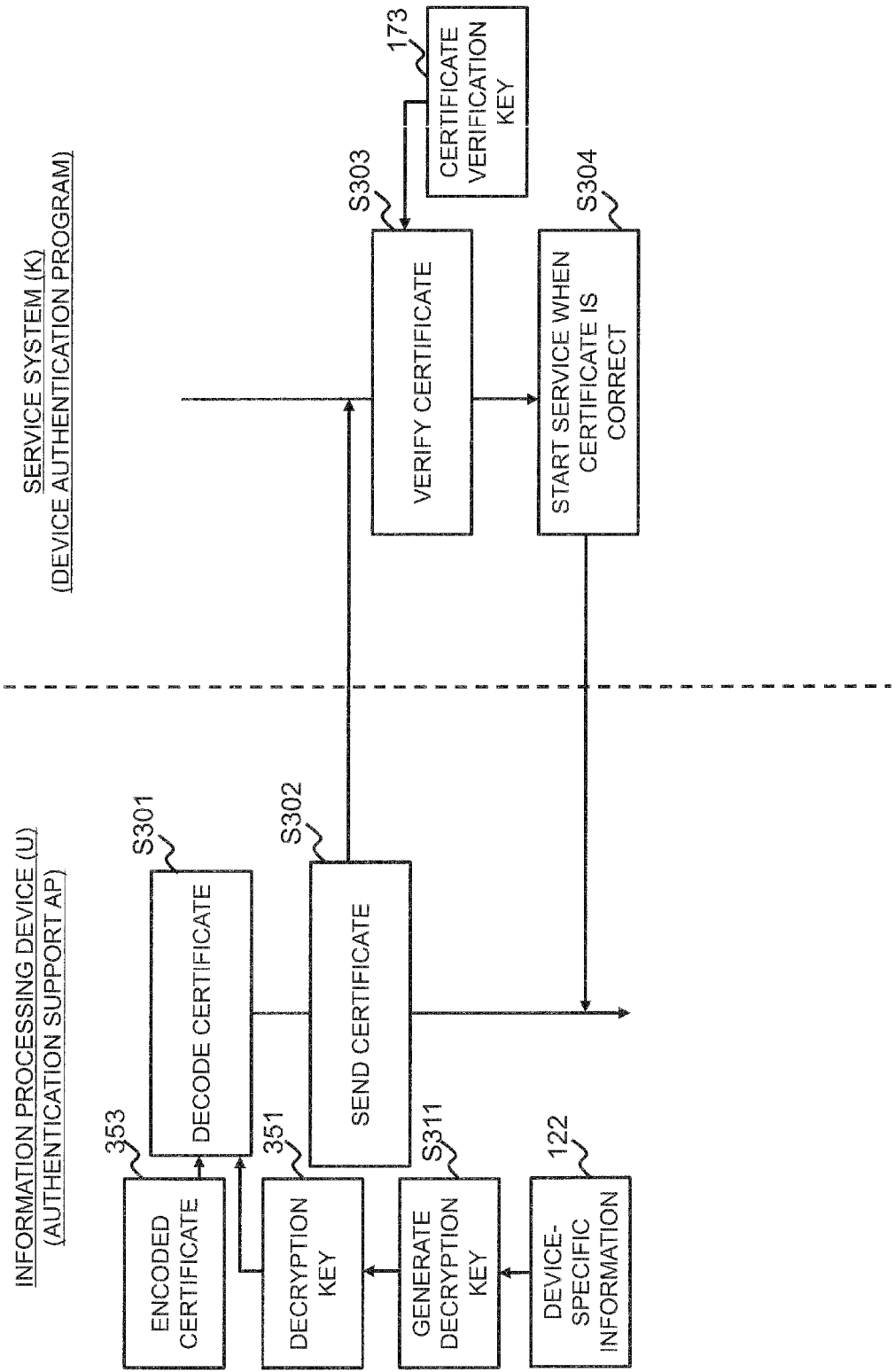
FIG. 3 shows the flow of processing performed in an authentication phase.

FIG. 3 shows the flow of processing performed in the authentication phase.

The authentication phase is the phase after the user registration phase, and, for example, is started when the information processing device 102 issues a request for service in response to an instruction from the user.

The authentication support AP 121 uses a decryption key 351 to decode the encoded certificate (the certificate that has been encoded) 353 inside the storage device 113 (S301). The decryption key 351 may be the same key (common key) as the encryption key 251 used for encoding the certificate, or may be a different key. In this embodiment, the decryption key 351 is the same key as the encryption key 251. The decryption key 351 may be the encryption key 251 itself, which as generated and stored in the user registration phase, or, as in this embodiment, may be re-generated (S311) by the authentication support AP 121 on the basis of the device-specific information 122 in a different phase than the user registration phase, such as the authentication phase.

The authentication support AP 121 sends the decoded certificate to the service system 151 (S302).

The service system 151 receives the certificate from the information processing device 102. The device authentication program 171 uses the certificate verification key 173 in the storage device 163 to verify the received certificate (303). That is, the device authentication program 171 determines whether or not the certificate is correct.

In a case where the device authentication program 171 has determined that the certificate is correct, the control device 162 in the service system 151 commences service (for example, issues an OTP (One-Time Password)).

The preceding is the processing performed in this embodiment.

According to this embodiment, generally speaking, device authentication is, of course, possible for an information processing device that comprises a secured storage area, but is also possible for an information processing device of a type that does not comprise a secured storage area.

Furthermore, according to this embodiment, device authentication can be performed without communicating the device-specific information 122 of the information processing device 102 to the service system 151.

Furthermore, according to this embodiment, the certificate stored in the information processing device 102 is encoded, this encoded certificate can not be correctly decoded without using a decryption key 351 based on the device-specific information 122 of the information processing device 102 that encoded this certificate, therefore, even in a case where the certificate leaks out of the information processing device 102, this certificate can not be used to authenticate another information processing device.

In this embodiment, the following processing may also be performed.

For example, the certificate may be updated either regularly or irregularly (for example, on a prescribed schedule). Specifically, for example, the following can be considered.

(*) The device authentication program 171 may perform S203 and S204 of FIG. 2 for the user 101 each time S304 of FIG. 3 (the successful verification of the certificate) is performed Y times (where Y is an integer equal to or greater than 1). In so doing, in S203, the device authentication program 171 generates a certificate using a certificate generation key 172 that differs from the certificate generation key 172 used to generate the previous certificate for the user 101.

(*) Or, the authentication support AP 121 performs the user registration phase either regularly or irregularly for the same service system 151. In so doing, in a current user registration phase, the device authentication program 171 generates a certificate using a certificate generation key 172 that differs from the certificate generation key 172 used when generating the certificate in a user registration phase of the past. In accordance with this, an encoded certificate 353 that differs from the encoded certificate 353 stored in the past user registration phase is stored in the storage device 113 of the information processing device 102 by the authentication support AP 121 in this user registration phase.

The device authentication program 171 may include information representing a certificate version (hereinafter, version information) in the certificate, and, in addition, a certificate verification key 173 for each version, and information representing the corresponding relationship between the version information and the certificate verification key 173 (hereinafter, version/verification key association information) may be stored in the storage device 163. In S303, the device authentication program 171 may use the version/verification key association information to identify, from among multiple certificate verification keys 173, the certificate verification key 173 corresponding to the version information included in the certificate, and to determine whether or not the certificate is correct using the identified certificate verification key 173. Furthermore, the above-described version/verification key association information may not necessarily have to exist. When this is the case, the device authentication program 171 may perform verification using the certificate verification keys 173 in sequence, and may determine that the certificate is correct in a case where a result of legitimate is obtained using any one of the certificate verification keys 173.

Thus, since the certificate is either regularly or irregularly updated, even in a case where the encoded certificate 353 is decoded illegitimately, the illegitimately decoded certificate can be used to prevent the authentication of an unauthorized information processing device.

For example, at least one of the encryption key 251 and decryption key 351, and the encoding/decoding algorithm performed by the authentication support AP 121 may be updated either regularly or irregularly (for example, on a prescribed schedule). Specifically, for example, the following can be considered.

(*) The authentication support AP 121 either regularly or irregularly updates the device-specific information 122 that is the basis of the encryption key 251 and the decryption key 351. In accordance with this, for example, there may be cases when the device-specific information 122 used the previous time is an individual identification number (IMEI), and the device-specific information 122 used this time is a telephone number.

(*) The authentication support AP 121 itself is updated either regularly or irregularly. For example, the authentication support AP 121 either regularly or irregularly accesses the server from which the authentication support AP 121 was downloaded (for example, the service system 151), receives a post-update authentication support AP 121 (or a difference with the pre-update authentication support AP 121) from the server, and the authentication support AP 121 in the information processing device 102 is updated on the basis of the received post-update authentication support AP 121 (or difference with the pre-update authentication support AP 121).

(*) The authentication support AP 121 is configured to selectively use multiple encoding algorithms. The authentication support AP 121 may select an algorithm for encoding a certificate either in accordance with a prescribed rule or at random, and may use the selected encoding algorithm to encode the certificate using the encryption key 251.

Furthermore, the authentication support AP 121 may store information (hereinafter code management information) representing the corresponding relationship between the encoded certificate 353 and a decoding algorithm and/or decryption key 351 in the storage device 113. At decoding time, the authentication support AP 121 may, on the basis of the code management information, identify the decryption key 351 and/or decoding algorithm corresponding to the encoded certificate 353 targeted for decoding, and use the identified decryption key 351 and/or decoding algorithm to decode the encoded certificate 353 targeted for decoding.

A device authentication system related to the example, for example, is applicable in the following environment.

Figure 4:
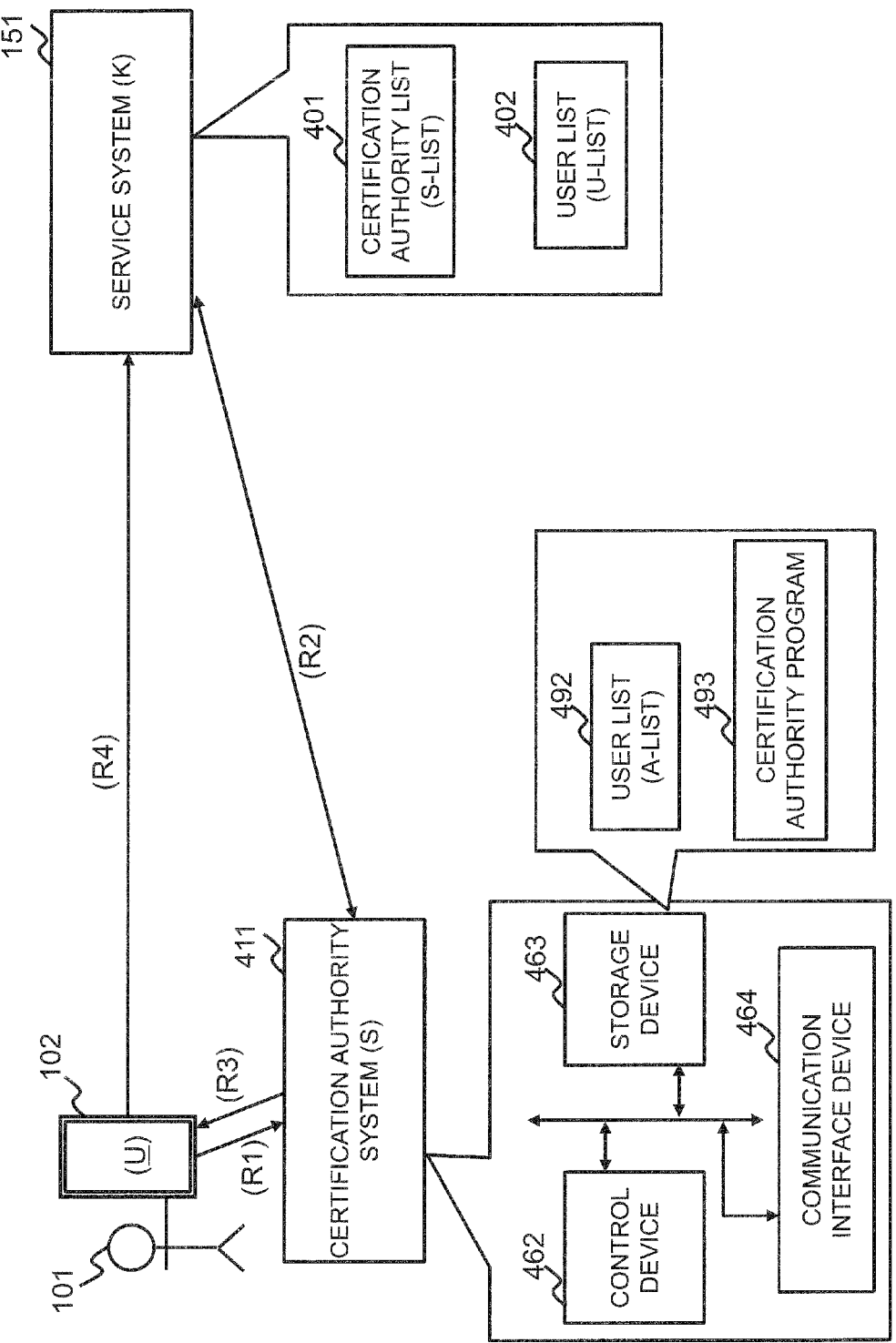
FIG. 4 is an OTP (One-Time Password) authentication system that includes the device authentication system related to the embodiment.

FIG. 4 is an OTP (One-Time Password) authentication system that includes a device authentication system related to the example.

The storage device 163 in the service system 151 stores a certification authority list 401 and a user list 402. The certification authority list 401 comprises information related to a certification authority system 411 for each certification authority system 411. The user list 402 comprises information related to an information processing device for each information processing device used by the user 101.

The certification authority system 411 is a computer (computer system) that is capable of communicating with the information processing device 102 and a service system 105. The certification authority system 411 is a computer system operated by a certification authority, and comprises a storage device 463, a communication interface device 464 for communicating with an external device such as the information processing device 102 and the service system 151, and a control device 462 coupled to the devices 463 and 464.

The storage device 463 stores information such as a user list 492, and a computer program such as a certification authority program 493. Either a portion or all of the information used by the certification authority system 411 may be stored, either instead of or in addition to the storage device 463, in an external storage apparatus (not shown in the drawing) with which the certification authority system 411 is capable of communicating via the communication interface device 464.

The user list 492 comprises information related to the certification authority system 411 for each certification authority system 411. The certification authority program 411 authenticates the user 101 by determining whether or not the OTP received from the information processing device 102 is correct.

The processing performed in the environment (OTP authentication system) shown in FIG. 4 will be explained hereinbelow. In so doing, the following notations will be used:

U: smartphone 102;
K: service system 151;
S: certification authority system 411;
S-List: certification authority list 401;
U-List: user list 402;
A-List: user list 492;
info: device-specific information 122;
$Sign_{key1}$(info): an electronic signature that applies a key key1 to info;
Verify*: electronic signature verification function (that is, when the certificate verification key 173 is used as key2, in the case where "information", in which (info, sig) are legitimate, and "signature value" are paired together, the value of $Verify_{key2}$(info, sig) is true, and when this is not the case, this value is false.);
hash(info): a hash function value for info;
$Enc_{key}$ (and $Dec_{key}$): encryption (decryption) function in a symmetric key encryption system that uses a key.

In the following explanation, it is supposed that U processing is performed by the authentication support AP 121, K processing is performed by the device authentication program 171, and S processing is performed by the certification authority program 493.

<Presettings>

When S has K issue the user 101 OTP, S registers its own system information (identification information) $ID_S$ in K, and shares a key key0 with K at this time. Information (including $ID_S$) and the key0 related to S are registered in the S-List for each S.

It is supposed that K has an original secret key (certificate generation key 172), and that K issues a signature (an electronic signature generated using a key) $g_s$ (=$Sign_{key}$($ID_S$||...)) for verifying the fact that a request in (R2), which will be explained further below, is from S, and delivers this signature to S.

<User Registration Phase>

The following (R1) through (R4) respectively correspond to (R1) through (R4) shown in FIG. 4.

(R1) U applies to S for use. At this time, the two decide the ID2 (the account character string for using the S service) to be used in the second authentication, which will be explained further below, and U sends S a pw (ticket use password) to be used in (R4).

(R2) S. upon receiving the use application from U, registers ID2 in the A-List, sends K a certificate $g_s$ as well as the ($In_S$, pw), and requests that a ticket be issued. K refers to the S-List and confirms this request is from S by verifying the certificate $g_s$, then determines a serial number n and the identifier mID for the U, arbitrarily selects a message $m_n$, and registers ($m_n$, mID) in the U-List as information corresponding to U. The identifier mID may be random information. K also generates a ticket t=$Sign_{key}$($m_n$||pw) to the serial number n, and after determining the time limit T of the ticket t, sends (mID, n, t, T) to S.

(R3) S sends (n, t, T) to U.

(R4) U determines the account character string ID1 used to issue the OTP, and sends K a request including (ID1, n, t, pw). The n, t, and pw in the sent information set are the information received from S in (R3). K, after checking to make sure that the time at which the request from U was received is within T (time, which is the time limit of the ticket t and is represented in t-associated information stored in K), uses the message $m_n$ in corresponding to n to compute $Verify_{key}$($m_n$||pw, t), and when true, associates ID1 with mID and registers ID1 in the U-List. The message $m_n$ may be random information. In addition, K generates a character string $u_n$ including the information of n ($u_n$ may be a character string having a greater number of characters than n), and sends U something that combines a signature g (=$\text{Sign}_{key}(u_n)$) therewith as the certificate cer (=($u_n$, g)). The cer serves as a membership card that is sent to K when U requests that a OTP be issued. That is, U must maintain the cer via a method that prevents the cer from being used by someone else, and this is realized in this embodiment in accordance with the method described hereinabove. That is, K generates the encryption key 251, which is the hash function of the info, and stores the cer by encoding it using this encryption key. That is, an $\text{EnC}_{hash\ (info)}$ (cer) is stored in the U. Also, $u_n$ is either a portion or all of the message $m_n$. That is, there may be cases when the entire message $m_n$ is not sent to the U. The signature g (=$\text{Sign}_{key}(u_n)$) may correspond to the certificate verification key 173. Also, since the signature g (=$\text{Sign}_{key}(u_n)$) is verifiable when there is a serial number n, the service system 151 does not have to store the generated certificate. This is because, as will be explained further below, it is possible to restore all text information as long as there is a serial number n in the authentication phase. Furthermore, the character string $u_n$ may include either numerals or symbols.

According to this series of processing, the three parties U, S, and K store the three pieces of information ID1, ID2, and mID associated with the U, with U storing the (ID1, ID2), S storing the (ID2, mID), and K storing the (ID1, mID), respectively.

K can use a prescribed generation algorithm to generate a certificate cer on the basis of a text and a certificate generation key. The entire text may be sent to U, but in this embodiment, a portion of the text and the certificate are sent to U and are stored in U. The portion of the text, for example, is the character string $u_n$ described hereinabove, and may include the serial number n. The text may also include another type of information, for example, version information representing the version of the certificate.

<Authentication Phase>
<<First Authentication: Issuance of OTP>>

U has to pass a first authentication by K in order to have an OTP issued for using S.

(A1) U decodes the $\text{EnC}_{hash(info)}$ (cer) and sends K the decoded cer and the $\text{ID}_S$ and ID1 of the certification authority system to be used.

(A2) K generates the OTP(otp) after referring to the U-List and confirming that U is able to use S. that the cer is legitimate, and that U meets the condition for issuing the OTP. In addition, K selects the mID corresponding to the ID1, attaches the signature g (=$\text{Sign}_{key0}$(mID||otp||j)) to (mID, otp, j) and sends same to S. sending only the otp of the (mID, otp, j) to the U. As used here, j is additional information, such as the issuance time. S, after using the key key0 being shared with U to confirm the legitimacy of (mID, otp, j), refers to the A-List, selects the ID2 corresponding to the mID, and sets a password otp and the time limit T2 thereof for the account.

According to the explanation hereinabove, K receives a portion of the text and the certificate, and can use the serial number n included in the text portion to restore the entire text. Then, K can use the restored text, the certificate, and the certificate verification key to verify the legitimacy of the certificate using a prescribed verification algorithm.

<<Second Authentication: Authentication Using OTP>>

U has to pass a second authentication by S in order to be able to actually use the S service.

(A3) U sends S the otp, which was sent from K in accordance with (A2), together with the ID2.

(A4) S, after having confirmed that U's access time does not exceed T2, verifies the legitimacy of the otp and provides service to U in accordance to the result thereof.

A number of examples of the present invention have been explained hereinabove, but the present invention is not limited to these examples.

For example, the hardware of the certification authority system 411 and the service system 151 may be the same or different. Specifically, for example, the certification authority system 411 and the service system 151 may be logically partitioned in a single server system (for example, a blade server system comprising multiple blade servers (hardware)). Also, the system for generating a certificate may be separate from the system for verifying the certificate.

What is claimed is:
1. A device authentication system, comprising:
an authentication support part executed by an information processing device; and
a server is configured to perform device authentication for authenticating the information processing device,
wherein, in a registration phase of the information processing device, the authentication part is configured to:
receive target information, without sending, to a registration destination, device-specific information stored in the information processing device, wherein the device-specific information is information that makes it possible to identify the information processing device, wherein the target information, which does not include the device-specific information, is generated using a generation key, and includes allocation information allocated to the information processing device in the registration phase,
encode the received target information by using the device-specific information or information based on the device-specific information as an encryption key, and
store the encoded target information in a storage device of the information processing device,
wherein, in an authentication phase of the information processing device,
the authentication support part is configured to decode the encoded target information using a decryption key corresponding to the encryption key used in the generation of the encoded target information stored in the storage device,
the authentication part is configured to send the decoded target information to the server without sending to the server the device-specific information,
the server is configured to receive the decoded target information from the information processing device, and
the server is configured to perform the device authentication for determining, based on a verification key and the allocation information in the target information, whether or not the received decoded target information is correct information issued in the registration phase of the information processing device.

2. A device authentication system according to claim 1, wherein the target information is regularly or irregularly updated.

3. A device authentication system according to claim 2, wherein the server, in a case where the target information has been determined to be correct Y times (where Y is an integer equal to or greater than 1), generates different target information and sends the different target information to the information processing device.

4. A device authentication system according to claim 1, wherein at least one of the encryption key and the decryption key corresponding thereto, and an encoding and decoding algorithm performed by the authentication support part is updated regularly or irregularly.

5. A device authentication system according to claim 1, wherein, in the registration phase, the server is configured to generate the target information including a the-character string that includes the allocation information and is part of a text and a signature which is based on the character string, to send the generated target information to the information processing device and to not store the target information, and wherein, in the authentication phase, the server is configured to, upon receiving the target information, restore the text based on the allocation information in the character string specified by the received target information, determine whether or not the received target information is correct target information issued in the registration phase, using the restored text and the verification key.

6. A device authentication system according to claim 1, wherein the server is a first server having first management information, wherein the target information is a certificate, wherein, in a registration phase of the information processing device, the authentication support part is configured to send a second ID and a password to a second server having second management information, the second server is configured to receive the second ID and the password, register the second ID and the password in the second management information, and send the password to the first server, the first server is configured to receive the password from the second server, register the allocation information or information based on the allocation information in the first management information, and send, to the second server, (a) a signature value generated using a key and based on the password and the allocation information, and (b) the allocation information or the information based on the allocation information, the second server is configured to receive (a) the signature value and (b) the allocation information or the information based on the allocation information, and send to the information processing device (a)the signature value and (b) the allocation information or the information based on the allocation information, the authentication support part is configured to send to the first server a request associated with a first ID, the password, the signature value, and the allocation information or the information based on the allocation information, wherein the request does not include the device-specific information, the first server is configured to receive the request, and determine, using a key and based on the password and the allocation information or the information based on the allocation information associated with the request, whether or riot the signature value associate with the request is correct, and the first server is configured, if the signature value associated with the request: is correct, to register the first ID associated with the request in the first management information, generate the certificate not including the device-specific information using the generation key and based on the allocation information, and send the certificate to the information processing device.

7. A device authentication system according to claim 6, wherein, in an authentication phase of the information processing device, the authentication support part is configured to send the decoded certificateand the first ID to the first server, the first server is configured, if the received decoded certificate is correct, to generate a one-time password (OTP), identify a management ID corresponding to the first ID from the first management information, send the OTP and the management ID to the second server, and send the OTP to the information processing device, the second server is configured to receive the OTP and the management ID from the first server, identify the second ID corresponding to the management ID from the second management information, and associate the OTP with the second ID, the information processing device is configured to receive the OTP from the first server, and send the second ID and the OTP to the second server, and the second server is configured to receive the second ID and the OTP from the information processing device, and determine, using the OTP associated with the received second ID, whether or not the received OTP is correct.

8. A server for performing device authentication for authenticating an information processing device, the server comprising:

a communication interface device configured to communicate with the information processing device; and a control device coupled to the communication interface device, wherein the control device is configured to receive the following information from the information processing device in an authentication phase:

target information, without device-specific information stored in the information processing device, wherein the device-specific information is information that makes it possible to identify the information processing device, wherein the target information being-sent to a registration destination in a registration phase of the information processing device, which does not include the device-specific information, is generated using a generation key, and includes allocation information allocated to the information processing device in the registration phase, the received target information being information, which, in the registration phase, is encoded by the information processing device using an encryption key, which is the device-specific information or information based on the device-specific information, and is stored in a storage device of the information processing device, and, in addition, in the authentication phase, is decoded by the information processing device using a decryption key corresponding to the encryption key, and wherein the control device is configured to perform the device authentication for determining, using a verification key and based on the allocation information in the target information, whether or not the received target information is correct information issued in the registration phase of the information processing device.

9. An information processing device, comprising a communication interface device is-configured to communicate with a server that executes device authentication for authenticating the information processing device based on target information received from the information processing device;

a storage device; and a control device coupled to the communication interface device and the storage device, wherein the storage device is configured to store device-specific information, which is information that makes it possible to identify the information processing device, and wherein the control device is configured to:
  receive, in a registration phase of the information processing device, without sending the stored device-specific information to a registration destination, target information, which does not include the device-specific information, is generated using a generation key, and includes allocation information. allocated to the information processing device in the registration phase, to encode the received target information by using the device-specific information or information based on the device-specific information as an encryption key,
  store the encoded target information in the storage device of the information processing device in the registration phase decode the encoded target information, in the authentication phase, using a decryption key that corresponds to the encryption key used in the generation of the encoded target information stored in the storage device, and
  send the decoded target information, in an authentication phase, to the server without sending the device-specific information to the server, which is to receive the target information from the information processing device and. to execute the device authentication for determining, using a verification key and based on the allocation information in the target information, whether or not the received target information is correct information issued in the registration phase of the information processing device.

10. A non-transitory computer-readable medium storing a computer program executed on an information processing device, which communicates with a server that performs device authentication for authenticating the information processing device based on target information received from the information processing device, and which includes a storage device, the computer program causing the information processing device to execute:
  in a registration phase of the information processing device, receiving target information, without sending to a registration destination device-specific information stored in the information processing device, wherein the device-specific information is information that makes it possible to identify the information processing device, wherein the target information, which does not include the device-specific information, is generated using a generation key, and includes allocation information allocated to the information processing device in the registration phase;
  encoding the received target information by using the device-specific information or information based on the device-specific information as an encryption key;
  storing the encoded target information in the storage device;
  in an authentication phase, using a decryption key that corresponds to the encryption key used in the generation of the encoded target information stored in the storage device to decode the encoded target information; and
  sending the decoded target information, in the authentication phase, to the server that is to receive the target information from the information processing device and to execute the device authentication for determining, using a verification key and based on the allocation information in the target information, whether or not the received target information is correct information issued in the registration phase of the information processing device, without sending to the server the device-specific information.

11. A device authentication method, comprising:
  with an information processing device, in a registration phase of the information processing device, receiving target information, without sending to a registration destination device-specific information stored in the information processing device, wherein the device-specific information is information that makes it possible to identify the information processing device, wherein the target information, which does not include the device-specific information, is generated using a generation key, and includes allocation information allocated to the information processing device in the registration phase;
  with the information processing device, encoding the received target information by using the device-specific information or information based on the device-specific information as an encryption key;
  with the information processing device, storing the encoded target information in a storage device of the information processing device;
  in an authentication phase, with the information processing device, using a decryption key that corresponds to the encryption key used in the generation of the encoded target information stored in the storage device to decode the encoded target information;
  with the information processing device, sending the decoded target information to the server without sending to the server the device-specific information;
  with the server, receiving the target information from the information processing device; and
  with the server, executing the device authentication for determining, using a verification key and based on the allocation information in the target information, whether or not the received target information is correct information issued in the registration phase of the information processing device.

12. A device authentication method for use in a device authentication system including an information processing device and a server, comprising:
  receiving the following information from an information processing device in an authentication phase:
    target information, without device-specific information stored in the information processing device, wherein the device-specific information is information that makes it possible to identify the information processing device wherein the target information sent to a registration destination from the information processing device in a registration phase of the information processing device, which does not include the device-specific information, is generated using a generation key, and includes allocation information allocated to the information processing device in the registration phase,
    the received target information being information, which, in the registration phase, is encoded by the information processing device using an encryption key, which is the device-specific information or information based on the device-specific information, and is stored in a storage device of the information processing device, and, in addition, in an authentication phase, is decoded by the information processing device using a decryption key corresponding to the encryption key; and executing device authentication for determining, using a verification key and based on the allocation information in the target information, whether or not the received target information is correct information issued in the registration phase of the information processing device.

13. A device authentication support method for use in a device authentication system including an information processing device and a server, comprising:

in a registration phase of an information processing device, with the information processing device, receiving target information, without sending to a registration destination device-specific information stored in the information processing device, which is information that makes it possible to identify the information processing device, wherein the target information, which does not include the device-specific information, is generated using a generation key, and includes allocation information allocated to the information processing device in the registration phase, using the information processing device, encoding the received target information by using the device-specific information or information based on the device-specific information as an encryption key;

using the information processing device, storing the encoded target information in a storage device of the information processing device; and in an authentication phase, with the information processing device, using a decryption key that corresponds to the encryption key used in the generation of the encoded target information stored in the storage device to decode the encoded target information, and with the information processing device, sending the decoded target information to the server without sending the device-specific information to the server that is to receive the target information from the information processing device and to execute device authentication for determining, using a verification key and based on the allocation information in the target information, whether or not the received target information is correct information issued in the registration phase of the information processing device.

* * * * *